United States Patent
Pilkington et al.

(10) Patent No.: US 12,047,440 B2
(45) Date of Patent: Jul. 23, 2024

(54) MANAGING WORKLOAD IN A SERVICE MESH

(71) Applicant: International Business Machines Corporation, Armonk, NY (US)

(72) Inventors: Adam John Pilkington, Eastleigh (GB); Gordon Douglas Hutchison, Eastleigh (GB); Timothy J. Mitchell, Chandlers Ford (GB); Graham C. Charters, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/494,337

(22) Filed: Oct. 5, 2021

(65) Prior Publication Data

US 2023/0108209 A1     Apr. 6, 2023

(51) Int. Cl.
*G06F 15/16* (2006.01)
*H04L 67/1012* (2022.01)
(Continued)

(52) U.S. Cl.
CPC ...... *H04L 67/1014* (2013.01); *H04L 67/1012* (2013.01); *H04L 67/51* (2022.05); *H04L 67/563* (2022.05)

(58) Field of Classification Search
CPC ... H04L 67/1014; H04L 67/563; H04L 67/51; H04L 67/1012
(Continued)

(56) References Cited

U.S. PATENT DOCUMENTS

| | | | |
|---|---|---|---|
| 8,260,894 B2 * | 9/2012 | Chun | H04L 67/1001 370/252 |
| 8,346,892 B2 * | 1/2013 | Chun | H04L 12/403 709/219 |

(Continued)

FOREIGN PATENT DOCUMENTS

| | | |
|---|---|---|
| CN | 106502792 A | 3/2017 |
| CN | 106663036 A | 5/2017 |

(Continued)

OTHER PUBLICATIONS

"Best practices for avoiding rate limiting", Zendesk Developer Docs, downloaded from the internet on Jun. 23, 2021, 1 page, <https://developer.zendesk.com/documentation/ticketing/using-the-zendesk-api/best-practices-for-avoiding-rate-limiting/>.

(Continued)

*Primary Examiner* — Alicia Baturay
(74) *Attorney, Agent, or Firm* — Aaron N. Pontikos

(57) ABSTRACT

In a service mesh, back-pressure is applied and relieved as needed by a control mechanism which is applied between pairs of services to control the rate at which service requests are made from one of service to the other via monitoring hardware and/or software metrics. A proxy of one service is monitored to observe the rate at which it receives service requests from the other service. If it is observed that the monitored metrics have breached allowable limits, back-pressure is applied to reduce the rate at which the other proxy transmits these service requests. Through continued monitoring of the proxy, the back-pressure can be later relieved when appropriate by increasing the permitted request rate.

20 Claims, 5 Drawing Sheets

US 12,047,440 B2

Page 2

(51) Int. Cl.
*H04L 67/1014* (2022.01)
*H04L 67/51* (2022.01)
*H04L 67/563* (2022.01)

(58) Field of Classification Search
USPC ............................................... 709/217
See application file for complete search history.

(56) References Cited

U.S. PATENT DOCUMENTS

| | | | |
|---|---|---|---|
| 8,473,960 B2 | 6/2013 | Chambliss | |
| 8,468,251 B1 | 7/2013 | Pijewski | |
| 8,533,103 B1 | 9/2013 | Certain | |
| 8,620,774 B1* | 12/2013 | Li | G06Q 30/06 705/27.1 |
| 8,930,489 B2 | 1/2015 | Goetz | |
| 8,990,452 B2 | 3/2015 | Branson | |
| 9,009,330 B2* | 4/2015 | Holloway | G06Q 10/107 709/227 |
| 9,766,960 B2 | 9/2017 | Wang | |
| 9,842,045 B2* | 12/2017 | Heorhiadi | G06F 11/3692 |
| 10,033,702 B2 | 7/2018 | Ford | |
| 10,037,230 B2 | 7/2018 | Chen | |
| 10,088,880 B2* | 10/2018 | Sundaram | G06F 1/3275 |
| 10,108,683 B2 | 10/2018 | Dhayapule | |
| 10,169,479 B2* | 1/2019 | Holloway | G06F 16/958 |
| 10,228,974 B2 | 3/2019 | Xue | |
| 10,268,839 B1 | 4/2019 | Kenthapadi | |
| 10,382,380 B1 | 8/2019 | Suzani | |
| 10,387,078 B1* | 8/2019 | Benisty | G06F 3/0659 |
| 10,452,843 B2* | 10/2019 | Dykes | G06F 21/552 |
| 10,547,456 B1* | 1/2020 | Liljenstolpe | H04L 9/006 |
| 10,613,903 B1 | 4/2020 | Kulkarni | |
| 10,621,263 B2* | 4/2020 | Holloway | H04L 63/0281 |
| 10,678,315 B2* | 6/2020 | Sundaram | G06F 1/3225 |
| 10,754,868 B2 | 8/2020 | Karuppiah | |
| 10,762,193 B2* | 9/2020 | Lev-Ran | H04L 9/3263 |
| 10,764,244 B1* | 9/2020 | Mestery | H04L 67/10 |
| 10,785,122 B2* | 9/2020 | Inamdar | H04L 41/082 |
| 10,795,992 B2* | 10/2020 | Dykes | G06F 21/552 |
| 10,805,213 B2* | 10/2020 | Pilkington | H04L 45/70 |
| 10,827,020 B1* | 11/2020 | Cao | H04L 67/561 |
| 10,841,336 B2* | 11/2020 | Cahana | G06F 21/606 |
| 10,922,377 B2* | 2/2021 | Holloway | G06F 16/958 |
| 10,931,744 B1 | 2/2021 | Liljenstolpe | H04L 9/3263 |
| 10,938,691 B1* | 3/2021 | Bonas | H04L 67/56 |
| 10,958,662 B1* | 3/2021 | Sole | H04L 63/0853 |
| 10,999,312 B2* | 5/2021 | Viswambharan | G06F 9/5072 |
| 11,018,991 B1* | 5/2021 | Vishwakarma | H04L 47/823 |
| 11,042,415 B2 | 6/2021 | Wood | |
| 11,134,058 B1* | 9/2021 | Sole | H04W 12/12 |
| 11,150,963 B2* | 10/2021 | Nainar | G06F 9/541 |
| 11,171,842 B2* | 11/2021 | Palladino | H04L 47/74 |
| 11,175,939 B2* | 11/2021 | Kumatagi | G06F 9/45558 |
| 11,201,787 B1* | 12/2021 | Oppenheimer | H04L 41/0843 |
| 11,221,943 B2* | 1/2022 | Gamliel | G06F 11/3684 |
| 11,249,856 B2* | 2/2022 | Natanzon | G06F 16/128 |
| 11,252,091 B1* | 2/2022 | Singh | H04L 67/145 |
| 11,283,865 B2* | 3/2022 | Madisetti | H04L 9/50 |
| 11,290,284 B2* | 3/2022 | Liljenstolpe | H04L 9/3263 |
| 11,316,690 B2* | 4/2022 | Madisetti | H04L 41/044 |
| 11,316,933 B2* | 4/2022 | Madisetti | H04L 43/0882 |
| 11,321,419 B2* | 5/2022 | Holloway | H04L 61/5007 |
| 11,356,324 B2* | 6/2022 | Gefen | G06F 11/323 |
| 11,375,053 B1* | 6/2022 | Sreenivas Prasad | H04L 67/56 |
| 11,388,234 B2* | 7/2022 | Alagna | G06F 9/45558 |
| 11,399,013 B2* | 7/2022 | Bandi | G06F 21/53 |
| 11,405,451 B2* | 8/2022 | Pinheiro | G06N 20/00 |
| 11,412,000 B2* | 8/2022 | Khouderchah | G06F 21/554 |
| 11,416,380 B2* | 8/2022 | Gefen | G06F 11/3672 |
| 11,444,924 B2* | 9/2022 | Patwardhan | H04L 45/64 |
| 11,456,936 B2* | 9/2022 | Bonas | H04L 67/51 |
| 11,457,040 B1* | 9/2022 | Sole | H04L 63/101 |
| 11,457,080 B1* | 9/2022 | Meduri | H04L 67/60 |
| 11,477,197 B2* | 10/2022 | Mital | H04L 63/0884 |
| 11,489,738 B2* | 11/2022 | Palladino | H04L 41/5058 |
| 11,558,265 B1* | 1/2023 | Poornachandran | G06F 9/45558 |
| 11,561,868 B1* | 1/2023 | Poornachandran | G06F 11/165 |
| 11,570,264 B1* | 1/2023 | Poornachandran | H04L 67/562 |
| 11,582,589 B2* | 2/2023 | Taft | H04L 63/14 |
| 11,595,303 B2* | 2/2023 | Wang | H04L 45/64 |
| 2005/0256892 A1 | 11/2005 | Harken | |
| 2005/0262191 A1 | 11/2005 | Mamou | |
| 2006/0090163 A1 | 4/2006 | Karlsson | |
| 2008/0126639 A1 | 5/2008 | Oakes | |
| 2008/0163249 A1 | 7/2008 | Garza | |
| 2009/0063617 A1 | 3/2009 | Calow | |
| 2013/0173803 A1 | 7/2013 | Pijewski | |
| 2013/0254318 A1 | 9/2013 | Colar | |
| 2014/0075445 A1 | 3/2014 | Wang | |
| 2014/0153422 A1 | 6/2014 | Nambiar | |
| 2014/0325519 A1 | 10/2014 | Li | |
| 2015/0040133 A1 | 2/2015 | Caufield | |
| 2015/0046279 A1 | 2/2015 | Wang | |
| 2015/0058484 A1 | 2/2015 | Mehta | |
| 2016/0021196 A1 | 1/2016 | Gaurav | |
| 2016/0080484 A1 | 3/2016 | Earl | |
| 2016/0117253 A1 | 4/2016 | Sprouse | |
| 2018/0173777 A1 | 6/2018 | Cannaliato | |
| 2018/0270299 A1 | 9/2018 | Mccourtney | |
| 2018/0352053 A1 | 12/2018 | Kosim-Satyaputra | |
| 2019/0042305 A1 | 2/2019 | McDonnell | |
| 2019/0089647 A1 | 3/2019 | Das | |
| 2019/0102536 A1 | 4/2019 | Chopra | |
| 2019/0182168 A1 | 6/2019 | Bastide | |
| 2020/0026710 A1 | 1/2020 | Przada | |
| 2020/0162380 A1 | 5/2020 | Pilkington | |
| 2020/0371839 A1 | 11/2020 | Bonagiri | |
| 2021/0149728 A1 | 5/2021 | Wood | |
| 2021/0202031 A1 | 7/2021 | Tevet | |
| 2023/0108209 A1 | 4/2023 | Pilkington | |
| 2023/0109396 A1* | 4/2023 | Jain | H04L 63/0236 709/224 |
| 2023/0161652 A1* | 5/2023 | Soule | G06F 9/5044 719/328 |
| 2023/0176934 A1* | 6/2023 | Soule | G06F 9/547 719/328 |
| 2023/0195597 A1* | 6/2023 | Guzman | G06F 11/3656 717/124 |
| 2023/0195601 A1* | 6/2023 | Poornachandran | G06N 20/00 717/124 |
| 2023/0198875 A1* | 6/2023 | Poornachandran | H04L 41/0806 709/224 |
| 2023/0231912 A1* | 7/2023 | Vohra | H04L 67/561 709/217 |

FOREIGN PATENT DOCUMENTS

| | | |
|---|---|---|
| CN | 107301113 A | 10/2017 |
| CN | 109271435 A | 1/2019 |
| CN | 109299180 A | 2/2019 |
| CN | 109861850 A | 6/2019 |
| JP | 2008269152 A | 11/2008 |
| JP | 2017529585 A | 10/2017 |
| WO | 2016010936 A1 | 1/2016 |
| WO | 2021099903 A1 | 5/2021 |

OTHER PUBLICATIONS

"Method to Provide Resilience to Failures Due to Rate Limiting in Long Running Processes by Automatically Pausing and Resuming in an Adaptive Way", An IP.com Prior Art Database Technical Disclosure, Authors et al.: Disclosed Anonymously, IP.com No. IPCOM000263829D, IP.com Electronic Publication Date: Oct. 8, 2020, 4 pages.

"Rate Limits", AdWords API, downloaded from the internet on Jun. 23, 2021, 9 pages, <https://developers.google.com/adwords/api/docs/guides/rate-limits>.

(56) References Cited

OTHER PUBLICATIONS

International Search Report and Written Opinion, International Application No. PCT/IB2020/060699, International Filing Date Nov. 13, 2020.

Lee et al., "Optimal Design and Use of Retry in Fault Tolerant Realtime Computer Systems", An IP.com Prior Art Database Technical Disclosure, Original Publication Date: May 1, 1984, IP.com No. IPCOM000128483D, IP.com Electronic Publication Date: Sep. 16, 2005, 21 pages.

Mell et al., "The NIST Definition of Cloud Computing", Recommendations of the National Institute of Standards and Technology, Special Publication 800-145, Sep. 2011, 7 pages.

Poncini et al., "Optimizing Transmission Rate Selection in Basic Service Sets", An IP.com Prior Art Database Technical Disclosure, Original Publication Date: Sep. 22, 2009, IP.com No. IPCOM000188114D, IP.com Electronic Publication Date: Sep. 22, 2009, Copyright: Copyright 2009 Microsoft, 21 pages.

Shue et al., "Performance Isolation and Fairness for Multi-Tenant Cloud Storage", USENIX Association, 10th USENIX Symposium on Operating Systems Design and Implementation (OSDI '12), pp. 349-362.

Tan et al., "Tempo: Robust and Self-Tuning Resource Management in Multi-tenant Parallel Databases", Proceedings of the VLDB Endowment, vol. 9, No. 10, pp. 720-731, Copyright 2016 VLDB Endowment 2150-8097/16/06.

Zhang, Will, "Improving Microservice Reliability with Istio", 2020 Association for Computing Machinery, 7 pages.

List of IBM Patents or Patent Applications Treated as Related, Filed Oct. 5, 2021, 2 pages.

Xing et al., "Managing Extract, Transform and Load Systems", U.S. Appl. No. 17/362,157, filed Jun. 29, 2021.

International Search Report and Written Opinion, International Application No. PCT/EP2022/076446, International Filing Date Sep. 22, 2022.

List of IBM Patents or Patent Applications Treated as Related. Filed Sep. 25, 2023. 2 pages.

International Search Report and Written Opinion dated Dec. 16, 2022 from International Application No. PCT/EP2022/076446 filed Sep. 22, 2022.

International Search Report and Written Opinion dated Feb. 2, 2021 from International Application No. PCT/IB2020/060699 filed Nov. 13, 2020.

\* cited by examiner

MANAGING WORKLOAD IN A SERVICE MESH

FIELD OF THE INVENTION

The present disclosure relates generally to the field of managing workloads, and specifically to managing workloads in service mesh architectures.

BACKGROUND

Load-balancing algorithms are widely used in request management, for example for managing requests to a website that needs to be able to handle requests at a generally unknown and fluctuating rate. A router receives requests and distributes the requests to available systems according to a load-balancing algorithm. Load balancing can be classified as either static or dynamic, where the former does not take account of the current state of the system, whereas the latter does. Often the load-balancing algorithm will include a mixture of static and dynamic elements in a hybrid approach, e.g., fixed and variable resourcing components.

An example of a simple static load-balancing approach is 'round-robin' load balancing, in which requests are allocated to systems according to a cycle through the available systems, like dealing out playing cards to start a card game. An example of a simple dynamic load-balancing approach would be to route the request to the same server that handled the last one of that type. If that server is busy then another server is selected and that becomes the preferred server for the next request of that type.

Dynamic load balancing may be used to provide: automatic scaling of system resources; workload management (WLM); and management to comply with a service level agreement (SLA). Dynamic load balancing will become active when a system stress measurement shows that loading has exceeded a threshold, i.e., become overloaded. Examples of stress-related parameters that may be used to determine when to initiate dynamic load balancing are request processing latency and processor utilization. WLM solutions monitor stress-related parameters and, when they exceed certain thresholds, take action to manage the workload, e.g., by adding new server instances for increasing producer capacity.

Recently there has been growing interest in reactive approaches to load balancing. In a reactive system, an originator of a request is referred to as a producer, a processor of a request is referred to as a consumer and a request is referred to as an event or item. In reactive approaches, consumers of events are put in control of load balancing, instead of concentrating management on the producer. Each consumer communicates to the producer to request a new 'batch' of events, with the consumers deciding when to send a batch request to the producer based on their own loading. Producers therefore do not overload the system, since their output is limited by the consumers to a level that can be processed without excessive queuing at the consumers. This reactive approach is referred to as back-pressure or ticketing.

Since a reactive system pre-emptively avoids system resources becoming stressed, measurements of system stress as used in traditional load-balancing algorithms are no longer diagnostic of system loading. It is therefore no longer transparent what request rate a service is capable of handling without becoming overloaded.

BRIEF SUMMARY OF THE INVENTION

According to an embodiment of the present invention, a computer-implemented method for regulating cloud resource budget consumption, the computer-implemented method comprising: receiving, by one or more processors, a cloud resource budget limit and a cloud budget time interval; estimating, by the one or more processors, future cloud resource requests expected to arrive before an end of the cloud budget time interval; calculating, by the one or more processors, definitive costs and estimated costs of cloud resource usage types associated with cloud resource requests; calculating, by the one or more processors, a total estimated resource budget consumption based on summing the definitive costs and the estimated costs; determining, by the one or more processors, if the total estimated resource budget consumption exceeds the cloud resource budget limit; responsive to the total estimated resource budget consumption not exceeding the cloud resource budget limit, outputting, by the one or more processors, a set of existing unfulfilled cloud resource requests that can be fulfilled; and responsive to the total estimated resource budget consumption exceeding the cloud resource budget limit, outputting, by the one or more processors, a subset of the set of existing unfulfilled cloud resource requests that can be fulfilled and do not exceed the cloud resource budget limit.

According to an embodiment of the present invention, a computer program product for managing a workload in a service mesh hosted by a computer system, the service mesh comprising a plurality of proxies connected to respective services, the computer program product comprising: one or more non-transitory computer readable storage media and program instructions stored on the one or more non-transitory computer readable storage media, the program instructions comprising: monitoring a first proxy of a first service which is receiving service requests that have been transmitted from a second service via a second proxy associated with the second service; monitoring at least one metric of the computer system, whose value is indicative of how efficiently the computer system is able to perform the service requests and which is ascribed a permitted range associated with efficient operation of the computer system; responsive to the value lying outside the permitted range, throttling the request rate to apply back-pressure by imposing a limit on the request rate at which the second proxy is permitted to transmit service requests to the first proxy; and removing the limit after the value of the metric has returned to lie within its permitted range.

According to an embodiment of the present invention, a computer system comprising a service mesh, the service mesh comprising: a plurality of proxies with respective services; a data plane in which the proxies communicate with each other; and a control plane operable to manage the proxy communications, wherein the control plane is configured to manage service request rates between any pair of services by: monitoring a proxy of one service which is receiving service requests that have been transmitted from another service via said other service's proxy; monitoring at least one metric of the computer system, whose value is indicative of how efficiently the computer system is able to perform said service requests and which is ascribed a permitted range associated with efficient operation of the computer system; and, upon the value lying outside the permitted range; throttling the request rate to apply back-pressure by imposing a limit on the request rate at which said other service's proxy is permitted to transmit service requests to said proxy; and removing the limit after the value of the metric has returned to lie within its permitted range.

Other aspects and embodiments of the present invention will become apparent from the following detailed description, which, when taken in conjunction with the drawings, illustrate by way of example the principles of the invention.

BRIEF DESCRIPTION OF THE DRAWINGS

In the following, the present invention will further be described by way of example only with reference to exemplary embodiments illustrated in the figures.

DETAILED DESCRIPTION

Figure 1:
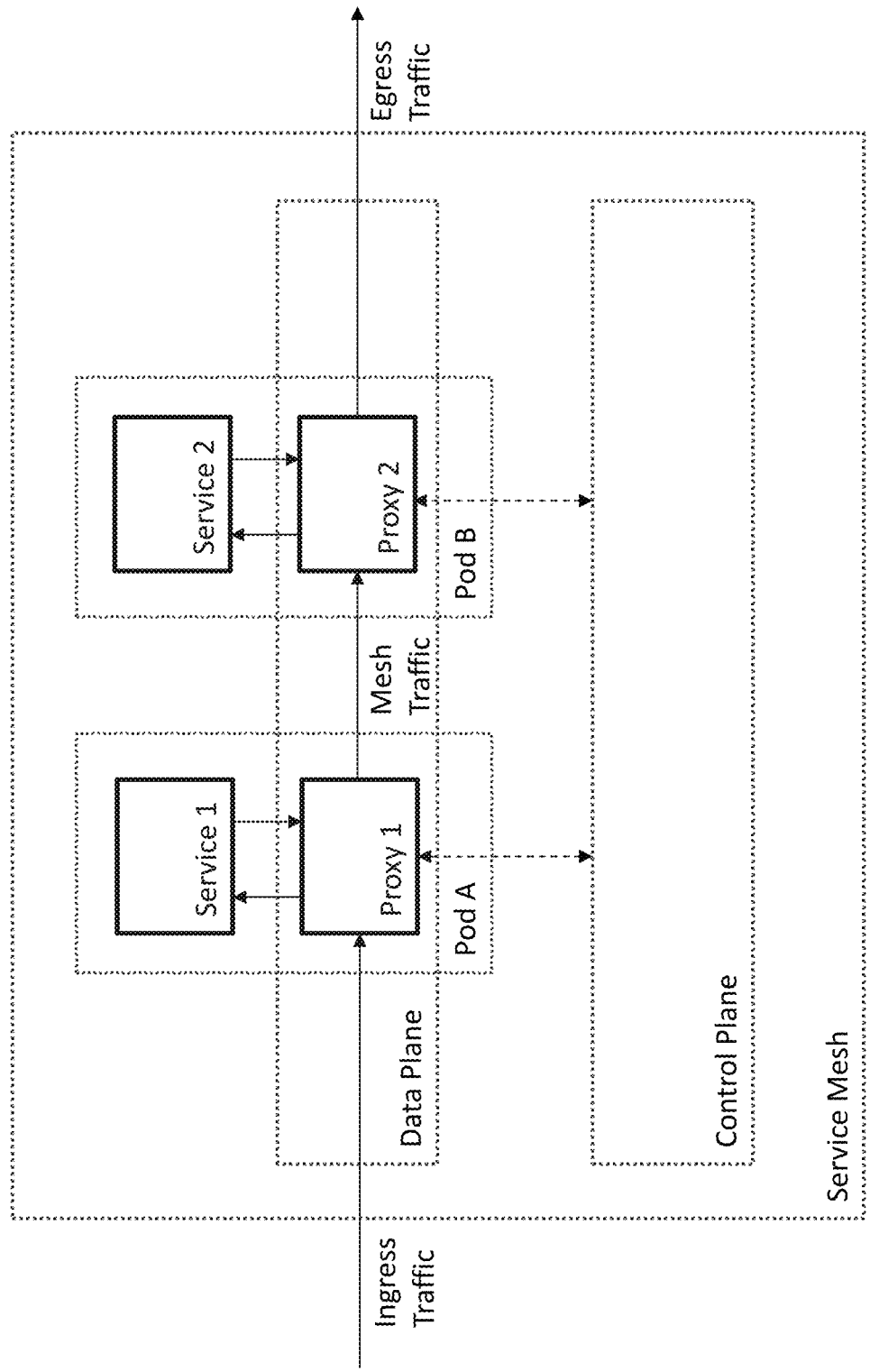
FIG. 1 is a schematic block diagram of an example service mesh architecture suitable for implementing embodiments of the disclosure.

In the following detailed description, for purposes of explanation and not limitation, specific details are set forth to provide a better understanding of the present disclosure. It will be apparent to one skilled in the art that the present disclosure may be practiced in other embodiments that depart from these specific details.

Embodiments of the invention can be implemented in a reactive system. In a reactive system, load balancing can be performed based on historical information of consumer behavior, e.g., to scale consumer capacity. Loading and load balancing in reactive systems can be expressed through the terms: 'windowing', 'batching', 'response time'/'latency' and 'burst capacity'. These terms have the following meanings:

'window' is the initial number of events requested by a consumer from a producer. For example, a consumer might initially request 100 events.

'batch' is the number of events subsequently requested by a consumer. For example, a consumer might subsequently request events in batches of 10. The frequency with which a consumer requests new batches is a function of the consumer's throughput capacity, since the consumer only requests events at the rate it is processing them. For example, if a consumer requests batches of 10 events every 5 seconds then it can be deduced that the consumer can process 2 events per second.

'response time' or 'latency' are measures of how quickly a consumer processes events. Processing of an event includes the consumer receiving the event, performing any actions associated with the event and providing any required acknowledge back to the producer. This can be estimated using batch size and batch frequency—the rate at which batches are requested and the size of batches requested. Batch size can also affect latency, for example, a consumer able to process 'n' events in parallel is likely to operate most efficiently if the batch size is 'n' and less efficiently with batch sizes that are either much smaller or much bigger than 'n'.

'burst capacity' is the maximum number of simultaneous events that consumers are capable of absorbing, i.e., effectively the buffer size. This may relate to a single consumer or to the whole system, i.e., all consumers collectively.

Embodiments of the invention are implemented as part of a service mesh. A service mesh can be an infrastructure layer for applications which are based on microservices, often referred to as services for short. The service mesh provides logic for governing communication between the microservices and thus manages how they are interconnected and how they interact. Accordingly, the service mesh can remove these roles from the services. The service interconnections can represent a data plane. The service interactions can represent a control plane which can be defined by communication policies, e.g., for authentication. The data plane and the control plane can communicate with each other via an API, sometimes called the data plane API. A service mesh may not be a mesh of services, but rather services can be assigned a proxy, sometimes called a sidecar or envoy, and it is these proxies that can be meshed. The services therefore may not directly communicate with one another, but rather indirectly via their proxies and the data plane can be a representation of the interconnections between the proxies. The data plane can serve to configure the inter-proxy communication links carrying the mesh traffic such that each proxy can have a suitable communication link. The proxies can monitor windowing and batching requests. This information may be used by the control plane to determine a suitable number of consumer services to provision.

FIG. 1 is a schematic diagram of an example service mesh. It should be understood that the service mesh can be an infrastructure layer hosted by a computer system, such as any of the computer systems described further below, comprising hardware and software. The hardware may comprise a physical hardware layer and one or more virtualization layers and may additionally include a management layer and a workloads layer. The software may comprise multiple layers from system software layers (e.g., including an operating system and device drivers), middleware layers, business-specific layers, to application software layers. Data can be received as ingress traffic and transmitted as egress traffic. Data within the service mesh can move within the data plane between proxies as mesh traffic. By way of a simple example, there can be only one ingress traffic communication line and one egress traffic communication line and a data plane consisting of first and second proxies, P1 and P2, which mediate and control the traffic, i.e., the data communication, between their respective first and second services S1 and S2. Each service-proxy pair may form a pod. Moreover, the service mesh may be within a container (not shown). More generally, there may be an arbitrary number of services and associated proxies and the data plane may support communication between any two proxies to allow mesh traffic to travel between them. The control plane can monitor Proxy 2 to observe the rate at which service requests are being received from Proxy 1, i.e., the rate at which calls for Service 2 are being received from Service 1. The control plane may also monitor Proxy 2 to observe the rate at which service requests from Service 1 are being completed by Service 2, e.g., by monitoring the rate at which Proxy 2 is sending responses back to Proxy 1 with the results (or other notification) of completed service requests.

Consider, by way of example, the traffic generated by Service 1 (S1) making calls to Service 2 (S2), which takes place via the respective proxies P1 and P2. Initially, there is no back-pressure and the reactive request rates between each service pair, e.g., S1-to-S2 and S2-to-S1, are set at initial values for a baseline. For example, the reactive request rate for Service 1 calling Service 2, i.e., S1-to-S2, may be set initially to 100 requests per second.

The control plane can monitor a value of a metric of the computer system hosting the service mesh. This may be a hardware specific system metric or a software specific system metric. If the measured value of the metric lies outside an acceptable range, e.g., by exceeding a threshold, then an intervention can be made in the service mesh as described below. A boundary of an acceptable range, e.g., a threshold, may be set at a value indicating an important resource is approaching scarcity or is scarce, or at a value indicating a software or hardware component is close to becoming overloaded or is overloaded.

When the system metric is measured to have fallen outside the acceptable range for that metric, the control plane acts to throttle the baseline rate of service requests from S1 to S2, e.g., to a value based on the distressed rate of S2-to-S1 responses recently observed to have been output from P2. To implement the throttling, the receiving proxy can slow down the service requests from the transmitting proxy in any number of ways, as known to a person skilled in the art. This throttling is also referred to as applying back-pressure. For example, the receiving proxy can: delay the dispatch of responses to the remote service; reduce the rate it reads the data from the remote service; and/or reject a portion of the received requests with a suitable Hypertext Transfer Protocol (HTTP) error code, e.g., processor 503.

Considering an example where a system metric being monitored is a count of the number of threads in an application. The thread count is observed to have increased from an initial value to beyond a threshold value. The threshold value has been chosen to be somewhat less than that which is predicted to make the application thread-bound. An application is thread-bound when the useful work done by the processor comes almost to a halt because of becoming pre-occupied with switching between threads to the detriment of working on the threads. Over this time, the rate of service requests sent from S1 to S2 has increased from its baseline value of 100 to 120, and the rate of completed requests has reduced from 100 to 80. An intervention triggered by the number of threads exceeding the threshold value throttles the baseline rate of new requests from S1 to S2 by reducing it to 80 per second, i.e., to the value of the recently observed completion rate.

Accordingly, back-pressure should reduce the thread count and this can be observed. Back-pressure is removed, either in one step or gradually in several increments, once the thread count returns to within the permitted range, i.e., to below threshold. In this example, the system metric is an integer value. To improve stability, removal (or stepwise reduction) of back-pressure may be conditional on the system metric, here the thread count, having reduced to a certain amount below the threshold that triggers throttling, e.g., with thread count a difference of 1, 2, 3 or some other integer less than the thread count threshold value that triggers throttling. Similarly, in the case of the system metric being a continuous (or quasi-continuous) variable, such as percentage processor utilization, relief of back-pressure may require the system metric value to be less than the value that triggers the introduction of back-pressure, e.g., by a certain proportion.

Once recovery is deemed to have occurred through the value of the system metric returning to within its permitted range, the throttled request rate can be incremented back towards the baseline value, e.g., in fixed increments of a fraction of the difference between the throttled value and the initial value. In our example, the increments in the request rate could be 5 per second, so that four increments would take the rate back up to the baseline value of 100. By adopting this incremental return to the initial value, the risk of causing a new overload immediately after each recovery and so oscillating between throttling and overloading and immediate throttling again is reduced. Once the baseline request rate has been restored to its pre-throttled value, here 100, the back-pressure management can be lifted, allowing the system to freely vary the request rates again, at least until such time as the monitoring of the system metric identifies the need to apply back-pressure.

It should be understood that within this self-regulating management of the request rates there are two mechanisms that can operate in tandem to respectively reduce and increase the rates: a throttling mechanism which reduces the rate at which requests are transmitted to or accepted by the receiving proxy; and a service recovery mechanism which increases the rate at which requests are transmitted to the receiving proxy. These two mechanisms are used by the control plane to control the request rates between any given pair of services by monitoring one or more system metrics related to hardware or software.

Embodiments described herein can introduce back-pressure semantics between any pair of services in the system. This may be implemented in addition to and operating in parallel with any existing back-pressure management systems, such as disclosed in the prior art. Furthermore, embodiments described herein can utilize monitoring of metrics which may be hardware metrics (e.g., infrastructure configuration, available memory, processor utilization, processor temperature, network traffic amount, network traffic speed, number of open connections, number of open file handles, free disk space, disk read/write speeds) and/or software metrics (e.g., response time such as request/response round trip time between the two services, throughput, such as the amount and/or frequency of data sent from one service and received back from another service, thread count, i.e., number of threads currently created, duration and length of garbage collection cycles in managed runtimes) in order to apply or relieve back-pressure.

Accordingly, the embodiments described herein may not be reliant on monitoring application-specific metrics (e.g., monitoring a work queue within an application). An advantage of this technique can be back-pressure semantics can be allowed to be applied without knowledge of the application that is generating the mesh traffic and without having to adapt the application. Back-pressure semantics can thus be applied without any knowledge of application design or performance. The back-pressure can be a point-to-point, i.e., pairwise between services, and therefore may not involve or modify operator graphs. Back-pressure can therefore be applied to any system, even one that was not designed to use back-pressure. Accordingly, back-pressure semantics can be applied retroactively to any application. For the same reasons, because the service mesh can be relied upon to provide the back-pressure, future applications (e.g., when converting an existing monolithic application into a microservice-based application), will not be required to build back-pressure management into the application.

Figure 2:
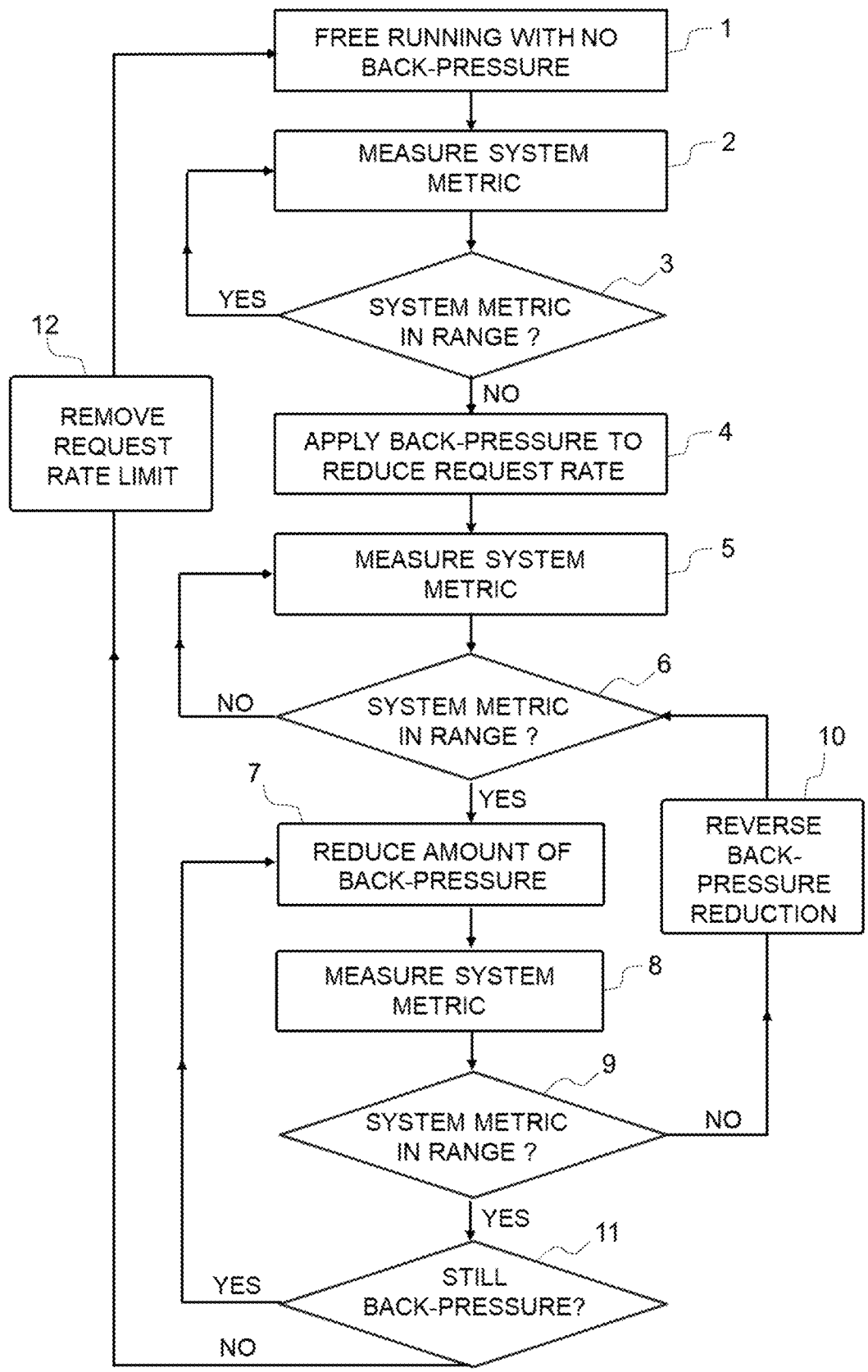
FIG. 2 is a flow diagram of an example implementation method.

FIG. 2 is a flow diagram of an example method of implementation showing how logic in the control plane manages provisioning of consumer service instances according to system needs.

In Step 1, the service mesh is running 'free' without any back-pressure. The service-to-service request rates between any pair of services in either direction may be set to initial baseline values which then can be allowed to evolve slowly over time without the need for back-pressure, assuming no overloads arise.

In Step 2, a hardware-related or software-related system metric is monitored by measuring its value. Optionally, a combination of two or more may be measured.

In Step 3, an embodiment can determine whether the measured value of the monitored system metric is within its permitted range, e.g., below a threshold indicative of overloading. In the case that two or more system metrics are monitored, the trigger may be when any one of the metrics is observed to be out of range, e.g., have exceeded their respective thresholds. Another option would be to have a compound trigger based on a formula or logical condition that represents some combination of values for two or more of the metrics. If 'yes', i.e., the system metric value is within its acceptable range, then the monitoring is continued by returning to Step 2. If 'no', then intervention is necessary and the flow moves to Step 4.

In Step 4, intervention is taken by applying back-pressure to throttle the uni-directional, inter-service request rate, e.g., using one of the methods mentioned above. The request rate may be throttled, e.g., to the current completion rate. Another option would be to throttle to a certain percentage of a baseline value for the request rate, e.g., 50%, 60%, 70%, 80% or 90%.

In Step 5, the system metric can be measured again.

In Step 6, an embodiment can determine whether the system metric is now within its permitted range. If the system metric is still out of its permitted range, e.g., still above threshold, then no action is taken and flow returns to Step 5 to measure the system metric again after a suitable delay. On the other hand, if the system metric is now back within its permitted range, e.g., below its threshold, then flow moves to Step 7 to reduce the back-pressure.

In Step 7, now that recovery has been sensed, the amount of back-pressure can be tentatively reduced, incrementing the request rate incrementally towards a pre-throttled value.

In Step 8, to assess whether the increase in requests is manageable, the value of the system metric can be measured again after a suitable delay and then in Step 9 an embodiment can check whether the system metric is within its permitted range. If the system metric value has deteriorated to be outside a permitted range, e.g., is now above a threshold, the previous increment in the request rate can be reversed in Step 10 and flow is returned to Step 6 for continued monitoring. In an alternative embodiment, Step 10 can return the request rate limit to the value set in Step 4, i.e., reversing previous increments, not only the immediately previous increment. In another aspect of an embodiment, if the system metric has remained within its permitted range, e.g., below threshold, then the system metric can be checked in Step 11 whether there is still some amount of back-pressure being applied, i.e., whether the currently permitted request rate is now back to the pre-throttling request rate. If 'yes' then one or more further increments in the request rate may be needed before the back-pressure will have been fully relieved, so that process flow moves to Step 7 for a further request rate increment. If 'no', then the traffic between the relevant pair of services in the direction being controlled can be allowed to run freely again without active management of the request rate through back-pressure. Namely, the process flow returns to Step 1 via Step 12 which removes the limit on the service request rate, so that the system reverts to free running with no back-pressure.

It can be appreciated that certain of these steps may be omitted in simpler implementations. For example, Steps 8 & 9 could be omitted. The incremental relief of the back-pressure may also be replaced with a simpler approach of fully removing the back-pressure. Here Steps 7, 8 & 10 would be replaced with a single step that removed the back-pressure. Step 9 could be retained to inhibit an unstable binary oscillation between states arising when back-pressure is applied, then lifted, then immediately re-applied and so forth, since no recovery is taking place. Moreover, as already mentioned further above, these methods are not tied to any specific technique of applying and relieving back-pressure, a variety of such techniques being known to the skilled person and made available in different service mesh products. While the method has been described by way of example in respect of a single pair of services and calls only in one direction, it will be appreciated that the method can be applied bi-directionally in case of services calling each other and between any arbitrary pair of services.

Figure 3:
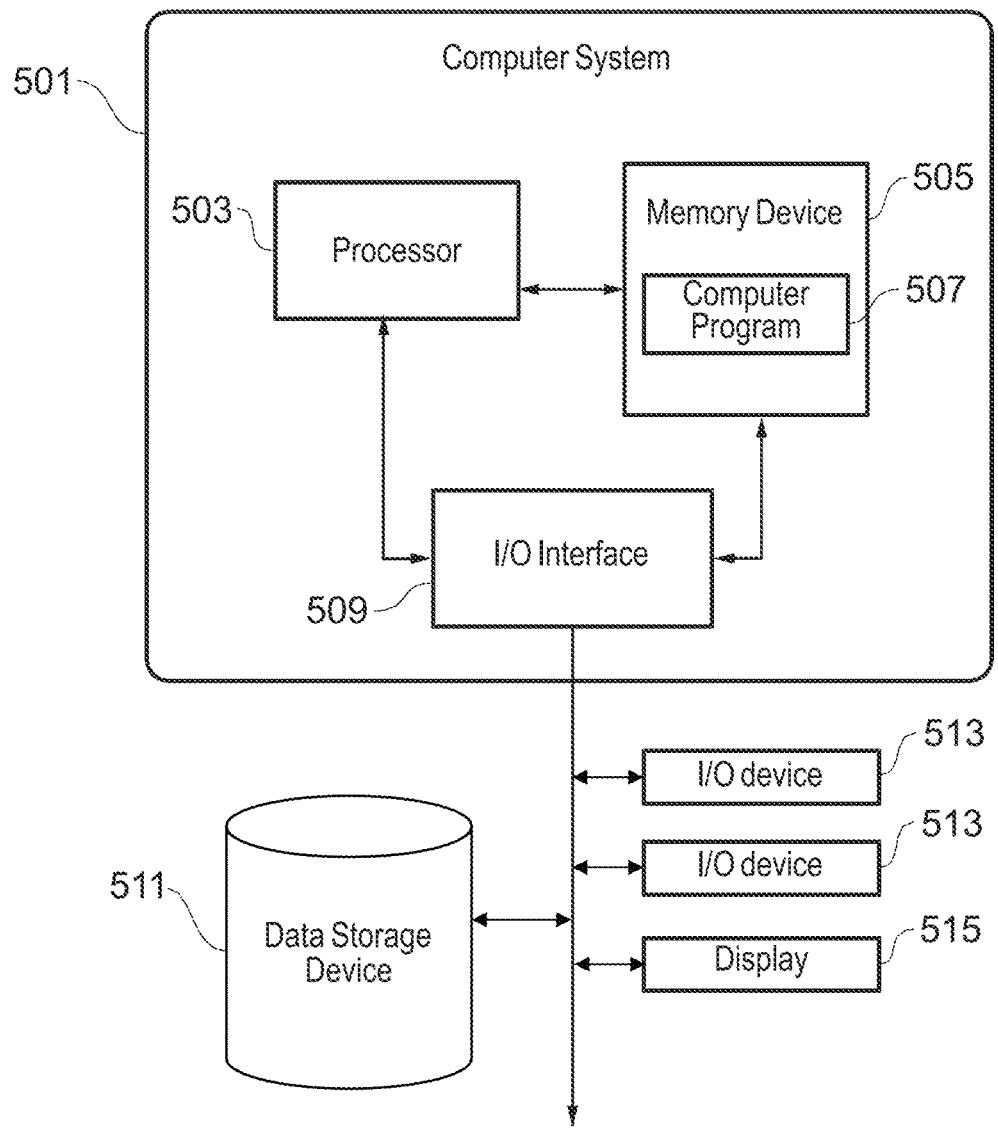
FIG. 3 shows a generic computer device which may be used as part of a computer system according to some embodiments of the disclosure.

FIG. 3 shows a structure of a computer system 501 and computer program 507 that may be used to implement embodiments of the invention, wherein the computer system may be a network node, such as a client or a server, such as the application server or third-party server referred to above, and the computer program 507 may be an application or an artefact. The computer system 501 comprises a processor 503 to provide a processor resource coupled through one or more I/O interfaces 509 to one or more hardware data storage devices 511 and one or more I/O devices 513, which can manage graphic object requests, and a display 515 on which the graphics objects can be displayed. The processor 503 may also be connected to one or more memory devices 505. At least one memory device 505 to provide a memory resource contains stored computer program 507, which is a computer program that comprises computer-executable instructions. The data storage devices 511 may store the computer program 507. The computer program 507 stored in the data storage devices 511 is configured to be executed by processor 503 via the memory devices 505. The processor 503 executes the stored computer program 507.

It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program operable to, when deployed into a computer infrastructure and executed thereon, cause the computing device to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatuses or other devices to produce a computer implemented process, such that the instructions which execute on the computer, other programmable apparatus, or other device implement the functions/acts specified in the flowchart and/or block diagram block or blocks.

It is to be understood that although this disclosure includes a detailed description on cloud computing, implementation of the teachings recited herein are not limited to a cloud computer system. Rather, embodiments of the present invention are capable of being implemented in conjunction with any other type of computer system now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer can deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computer system is service oriented with a focus on statelessness, low coupling, modularity, and semantic interoperability. At the heart of cloud computing is an infrastructure that includes a network of interconnected nodes.

Figure 4:
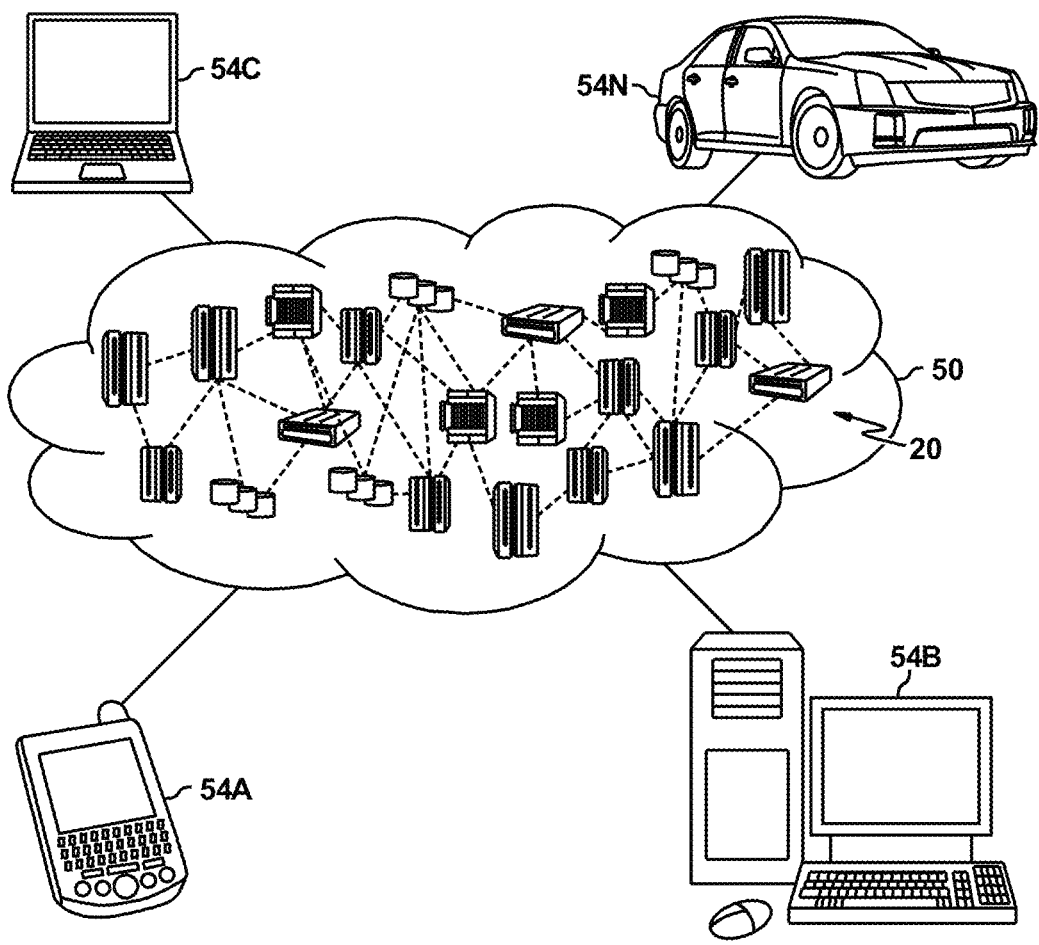
FIG. 4 depicts a cloud computer system according to an embodiment of the disclosure.

Referring now to FIG. 4, illustrative cloud computer system 50 is depicted. As shown, cloud computer system 50 includes one or more cloud computing nodes 20 with which local computing devices used by cloud consumers, such as, for example, personal digital assistant (PDA) or cellular telephone 54A, desktop computer 54B, laptop computer 54C, and/or automobile computer system 54N may communicate. Computing nodes 20 may communicate with one another. They may be grouped (not shown) physically or virtually, in one or more networks, such as Private, Community, Public, or Hybrid clouds as described hereinabove, or a combination thereof. This allows cloud computer system 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 20 and cloud computer system 50 can communicate with any type of computerized device over any type of network and/or network addressable connection (e.g., using a web browser).

Figure 5:
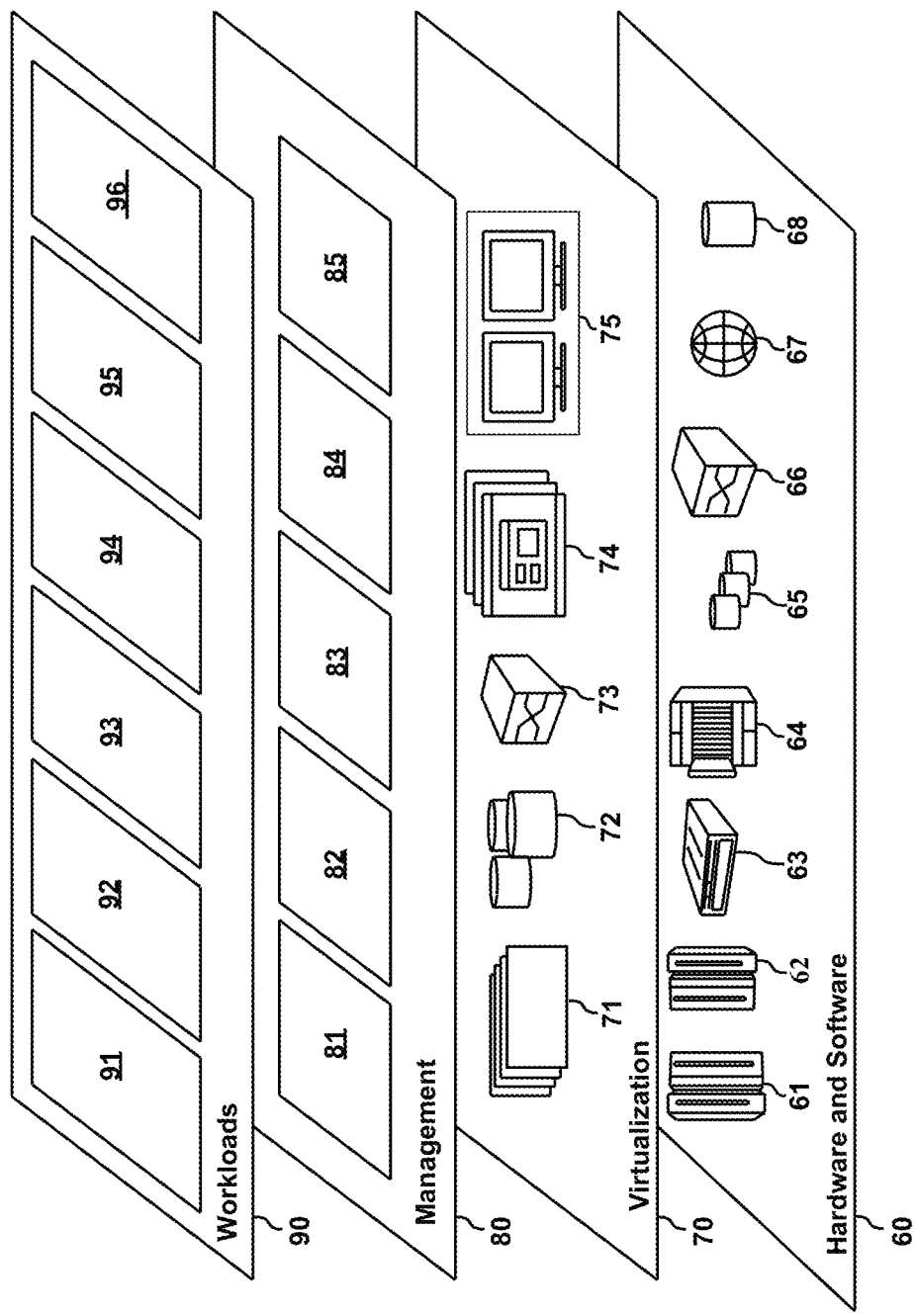
FIG. 5 depicts abstraction model layers according to an embodiment of the disclosure.

Referring now to FIG. 5, a set of functional abstraction layers provided by cloud computer system 50 (FIG. 4) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 60 includes hardware and software components. Examples of hardware components can include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computer system. Metering and Pricing 82 provide cost tracking as resources are utilized within the cloud computer system, and billing or invoicing for consumption of these resources. In one example, these resources may include application software licenses. Security provides identity verification for cloud consumers and tasks, as well as protection for data and other resources. User portal 83 provides access to the cloud computer system for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computer system may be utilized. Examples of workloads and functions which may be provided from this layer include: mapping and navigation 91; software lifecycle management 92; virtual classroom education delivery 93; data analytics processing 94; transaction processing 95; and a service mesh 96 according to embodiments of the disclosure.

It will be clear to one skilled in the art that many improvements and modifications can be made to the foregoing exemplary embodiment without departing from the scope of the present disclosure.

What is claimed is:

1. A method for managing a workload in a service mesh hosted by a computer system, the service mesh comprising a plurality of proxies connected to respective services, the method comprising:
    monitoring a first proxy of a first service which is receiving service requests that have been transmitted from a second service via a second proxy associated with the second service, using system metrics;
    monitoring a compound trigger created from a plurality of metrics of the computer system, whose value is indicative of how efficiently the computer system is able to perform the service requests and which is ascribed a permitted range associated with efficient operation of the computer system, using system metrics, wherein the compound trigger is based on a predefined formula or logical condition;
    responsive to the value lying outside the permitted range, throttling a request rate to apply back-pressure by imposing a limit on the request rate at which the second proxy is permitted to transmit service requests to the first proxy;
    removing the limit after the value of the metric has returned to lie within its permitted range; and
    wherein the service mesh is within a container.

2. The method of claim 1, wherein relieving of the back-pressure is initiated after a time delay.

3. The method of claim 1, wherein removing the limit is conditional on the limit having been increased back to the service request rate as it was when the limit was first imposed.

4. The method of claim 1, wherein the increments have a magnitude set based on a fraction of a difference between the service request rate as it was when the limit was first imposed and the limit as imposed initially.

5. The method of claim 1, wherein each increment to the limit after the first is applied is conditional on the value of the metric remaining within its permitted range.

6. The method of claim 5, wherein, if the value of the metric once more lies outside its permitted range while the limit is being incremented, the limit is decremented back to or towards the limit as imposed initially.

7. The method of claim 1, wherein the at least one metric comprises a hardware metric.

8. The method of claim 1, wherein the at least one metric comprises a software application metric.

9. The method of claim 1, wherein metrics are from outside the service mesh.

10. The method of claim 1, wherein the first proxy and the second proxy communicate in a data plane of the service mesh and proxy monitoring is performed by a control plane of the service mesh.

11. The method of claim 1, wherein, before removing the limit, the limit on the request rate is increased stepwise in increments towards the service request rate as it was when the limit was first imposed.

12. A computer program product for managing a workload in a service mesh hosted by a computer system, the service mesh comprising a plurality of proxies connected to respective services, the computer program product comprising:
    one or more non-transitory computer readable storage media and program instructions stored on the one or more non-transitory computer readable storage media, the program instructions comprising:
        monitoring a first proxy of a first service which is receiving service requests that have been transmitted from a second service via a second proxy associated with the second service, using system metrics;
        monitoring a compound trigger created from a plurality of metrics of the computer system, whose value is indicative of how efficiently the computer system is able to perform the service requests and which is ascribed a permitted range associated with efficient operation of the computer system, using system metrics, wherein the compound trigger is based on a predefined formula or logical condition;
        responsive to the value lying outside the permitted range, throttling the request rate to apply back-pressure by imposing a limit on a request rate at which the second proxy is permitted to transmit service requests to the first proxy;
        removing the limit after the value of the metric has returned to lie within its permitted range; and
        wherein the service mesh is within a container.

13. The computer program product of claim 12, wherein, before removing the limit, the limit on the request rate is increased stepwise in increments towards the service request rate as it was when the limit was first imposed.

14. A computer system comprising a service mesh, the service mesh comprising:
    a plurality of proxies with respective services;
    a data plane in which the proxies communicate with each other; and
    a control plane operable to manage the proxy communications, wherein the control plane is configured to manage service request rates between any pair of services by:
        monitoring a first proxy of a first service which is receiving service requests that have been transmitted from a second proxy associated with a second service, using system metrics;
        monitoring a compound trigger created from a plurality of metrics of the computer system, whose value is indicative of how efficiently the computer system is able to perform the service requests and which is ascribed a permitted range associated with efficient operation of the computer system, using system metrics, wherein the compound trigger is based on a predefined formula or logical condition;
        throttling a request rate to apply back-pressure by imposing a limit on the request rate at which the second proxy is permitted to transmit service requests to the first proxy;

removing the limit after the value of the metric has returned to lie within its permitted range; and wherein the service mesh is within a container.

15. The computer system of claim 14, wherein relieving of the back-pressure is initiated after a time delay.

16. The computer system of claim 14, wherein the at least one metric comprises a hardware metric.

17. The computer system of claim 14, wherein the at least one metric comprises a software application metric.

18. The computer system of claim 14, wherein metrics are from outside the service mesh.

19. The computer system of claim 14, wherein the first proxy and the second proxy are configured to communicate in the data plane, and wherein the control plane is configured to perform proxy monitoring.

20. The computer system of claim 14, wherein, before removing the limit, the limit on the request rate is increased stepwise in increments towards the service request rate as it was when the limit was first imposed.

* * * * *